United States Patent [19]
Ilg et al.

[11] Patent Number: 5,595,660
[45] Date of Patent: Jan. 21, 1997

[54] PLATE-TYPE SEPARATOR

[75] Inventors: Otto M. Ilg; Jeffrey S. Dugan, both of Asheville, N.C.

[73] Assignee: BASF Corporation, Mt. Olive, N.J.

[21] Appl. No.: 494,243

[22] Filed: Jun. 23, 1995

[51] Int. Cl.$^6$ ..................................................... B01D 21/20
[52] U.S. Cl. ................. 210/521; 210/512.3; 210/195.1; 210/519; 210/787; 209/713; 209/714; 209/403; 55/459.1
[58] Field of Search ................................. 210/195.1, 253, 210/255, 322, 380.1, 512.1, 512.3, 519, 521, 787; 209/713, 714, 493; 55/459.1

[56] References Cited

U.S. PATENT DOCUMENTS

| | | | |
|---|---|---|---|
| 4,554,074 | 11/1985 | Broughton | 210/519 |
| 4,702,837 | 10/1987 | Lecoffre et al. | 210/512.3 |
| 5,039,426 | 8/1991 | Giddings | 210/695 |
| 5,266,191 | 11/1993 | Greene | 210/195.1 |

Primary Examiner—David A. Reifsnyder
Attorney, Agent, or Firm—DePaoli & Frenkel

[57] ABSTRACT

A plate-type fluid separator is used to separate a plurality of mutually immiscible components from a mixed fluid stream thereof. The separator contains at least one separator flow plate which has formed on a common facial surface thereof at least one separation chamber. Each separation chamber contains at least one inlet means; a channel assembly in fluid communication with the inlet means and composed of a main flow channel split at a downstream end thereof into a plurality of branching flow channels; and a plurality of outlet means in fluid communication with the branching flow channels. The main flow channel separates the stream passing therethrough into a plurality of substantially discrete fluid phases having different average density or viscosity values. Each branching flow channel receives a discrete phase and passes such phase to the outlet means.

21 Claims, 5 Drawing Sheets

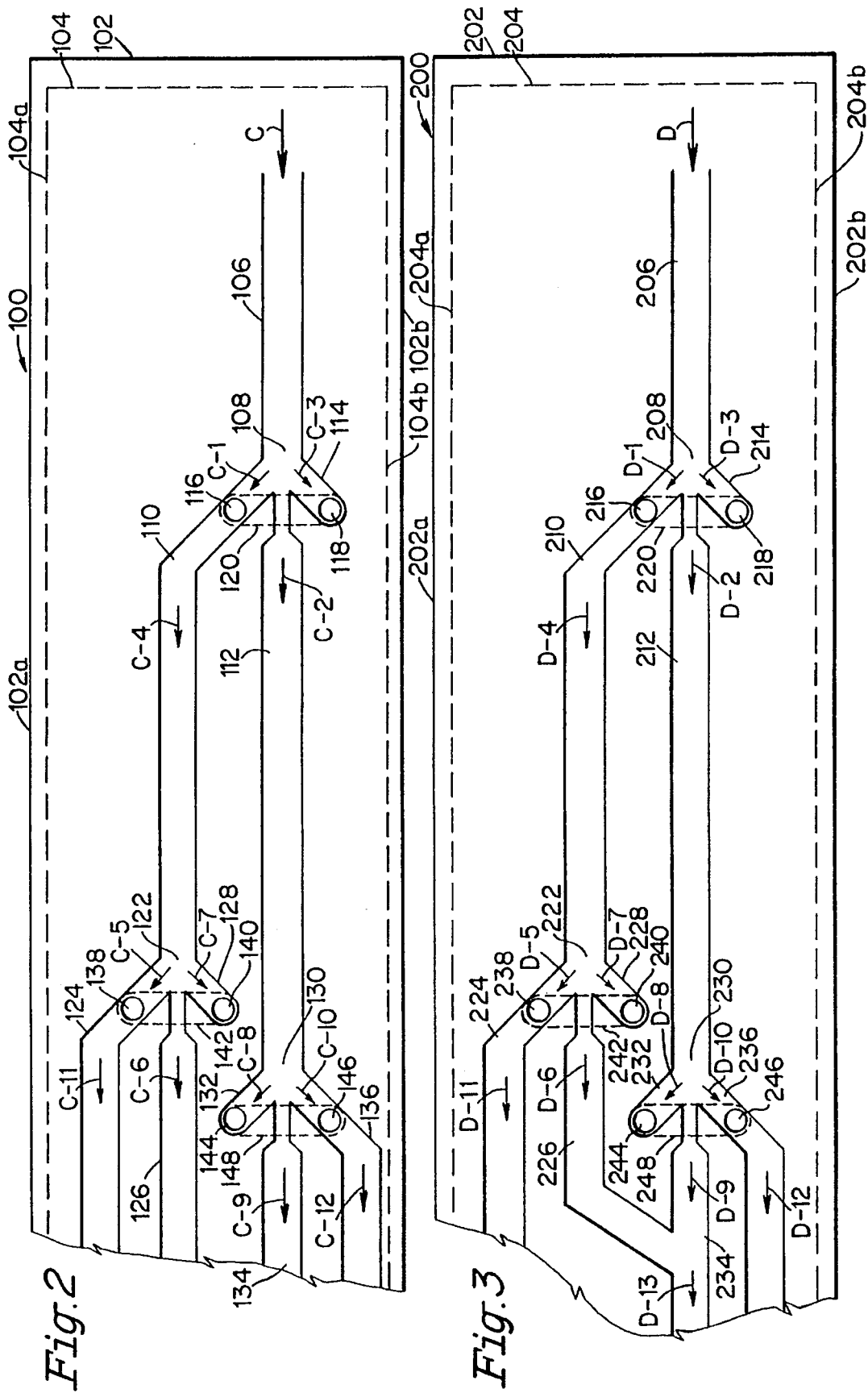

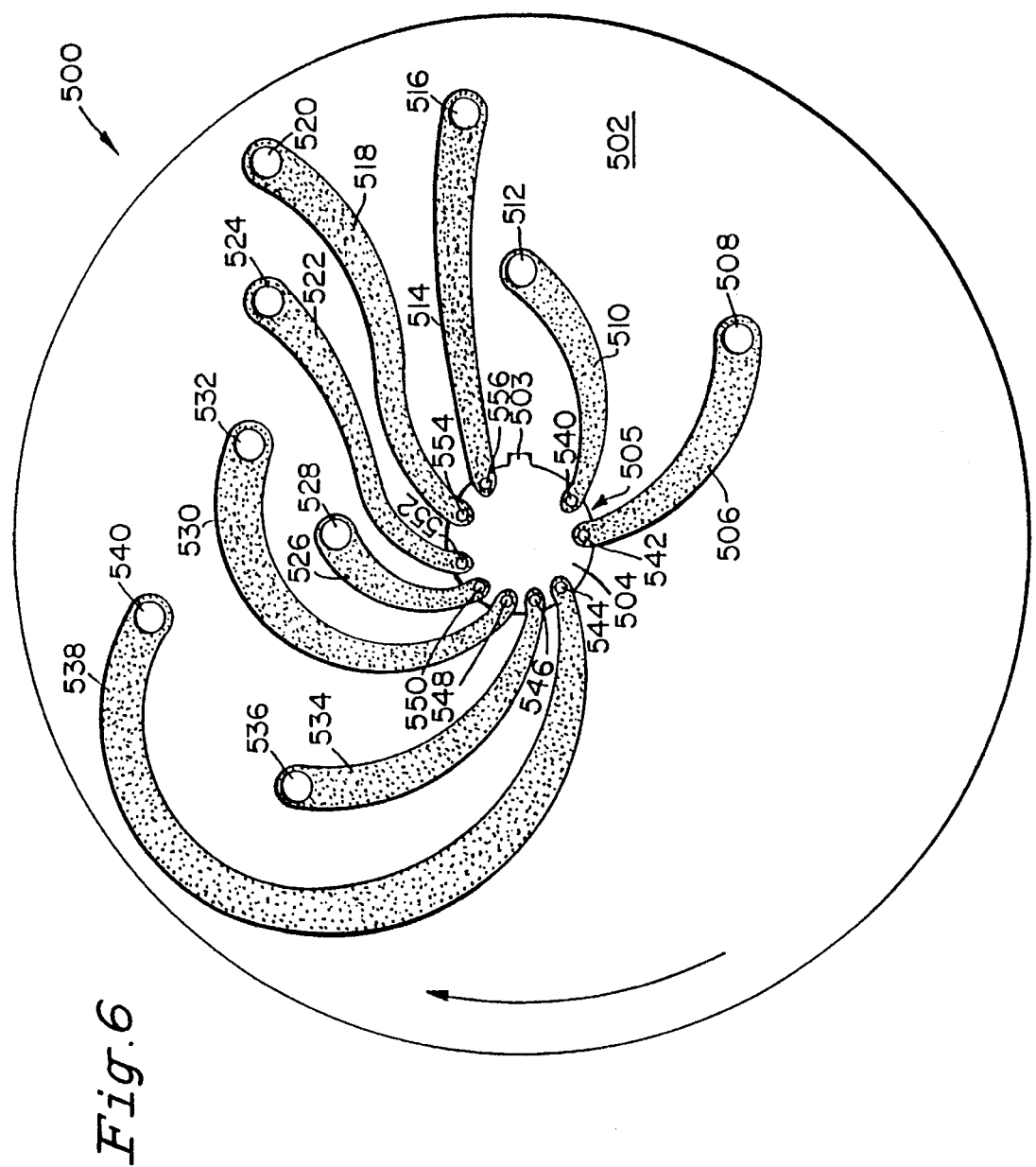

PLATE-TYPE SEPARATOR

BACKGROUND OF THE INVENTION

This invention relates to a plate-type separator. More particularly this invention relates to a plate-type fluid separator and a method of using same for separating two or more immiscible components from a fluid mixture thereof.

With environmental concerns on the rise, the development of improved means for separating immiscible components from mixtures thereof remains an important goal in modern society. The separation of immiscible components from fluid mixtures thereof has made it possible, for example, to recycle waste into useful materials, thus reducing the need for new landfills, which zoning regulations and neighborhood concerns have made difficult to find. Furthermore, the separation of such immiscible pollutants as oil particles from aqueous solutions thereof has reduced the pollution of streams, lakes, wells, and the like, with runoff or drainage discharge water contaminated with the immiscible oil particles. As concern for the environment grows in this country, various states as well as the federal government have imposed regulations governing the quality of such effluent water.

Plate-type separators and methods of using same for separating immiscible fluids from mixtures thereof are known in the art. Reference is made, for example, to U.S. Pat. Nos. 4,554,074 to Broughton; U.S. Pat. No. 5,266,191 to Greene et al.; and U.S. Pat. No. 5,039,426 to Giddings. However, as will be discussed hereinbelow, the separators and separation processes described in these references have drawbacks.

Broughton discloses a separator for separating high density and low density fluids, wherein the separator contains top and bottom support plates and an inlet fluid channel branched into multiple dual channels which convert the inlet channel turbulent fluid flow into a substantially laminar fluid flow. In Broughton, the portions become distinct within the branched structure but are separated after the stream exits the branched structure, separation being achieved by means of a funnel. Thus, in Broughton, the branched structure is not used to achieve the separation itself but to reduce the flow rate of the divided streams to result in laminar flow and the formation of distinct portions within the channels.

Greene et al. is directed to a separator for separating fluids having different buoyancies, wherein the separator is composed of a separator chamber having a plurality of parallel subchannels formed by spaced vertical plates. The subchannels in the Greene et al. separator have a geometry which reduces and controls the Reynolds number of the subchannels and controls the velocity through the subchannels, causing the flow to be substantially non-turbulent.

Giddings discloses a process for continuous particle and polymer separation wherein a stream of carrier fluid containing the material to be separated is injected into the inlet end of a thin channel and the flow rate is adjusted to a sufficiently high level such that flow-dependent lift forces the different components to different transverse positions by the time they reach the end of the channel. Outlet flow is split into at least two substreams by means of physical splitters, with the flowrates of the multiple substreams being adjusted such that the transverse position of the outlet splitting plane divides the particles into enriched phases, which are then collected from emerging outlet streams. The separation process taught in Giddings can achieve a high degree of efficiency in a single separation chamber by manipulating the flow rate through the chamber. Separation according to the Giddings method relies on lift forces which, as Giddings expressly teaches, are flow rate-dependent forces arising as a result of fluid motion. Giddings distinguishes lift forces from viscous and gravitational forces, which are not dependent on flowrate.

As stated hereinabove, the separators and separation methods disclosed in the references discussed above have several drawbacks. For example, the separator in each reference is designed to separate components according to density (i.e., buoyancy) differences. None of the references discloses a separator which can separate components differing in viscosity values. In particular, none of the references teach a single separator which is capable of separating components differing in density values and components differing in viscosity values. It would be desirable to provide a separator which can separate immiscible components differing in viscosity values as well as immiscible components differing in density values.

Another drawback to the separators and separation processes disclosed in the foregoing references is that separation in each of the references is dependent on flow rate. For example, the separation processes taught in Broughton and Greene et al. both require non-turbulent, substantially laminar flow; and the separation process taught in Giddings relies on lift forces, which are flow rate-dependent. It would be desirable to provide a separator which can effect separation of immiscible components regardless of the flow rate and regardless of whether the flow is turbulent or non-turbulent.

Broughton further has the disadvantage of requiring additional equipment, i.e., the funnel, and additional process steps, i.e., use of the funnel, to effect separation of immiscible components. In Broughton, separation does not occur in the branched structure but outside the branched structure, specifically, in the funnel. It would be desirable to provide a separator wherein the portions are mutually separated within the branched structure so as to eliminate the need for extra equipment and extra process steps.

Furthermore, none of the references disclose a separator wherein complete separation of the immiscible components is carried out on a single surface of a plate. As stated hereinabove, Broughton uses a funnel to separate the component portions from one another. The separators disclosed in Greene et al. and Giddings both require a plurality of spaced plates, the spaces between the plates themselves forming the requisite flow channels. It would be further desirable to provide a separator which can effect separation using only one plate. It would also be desirable to provide a separator which can effect separation using a single surface of a single plate.

In addition to the disadvantages described above, many conventional plate-type separators are also undesirably bulky, which increases the expense associated with making, cleaning, re-using and replacing the separators. For example, many conventional separators contain thick metal plates which, because of their thickness, are expensive to accurately drill, ream or otherwise machine. Moreover, with use, the separator must be periodically cleaned as material tends to solidify and collect within the separator's flow channels, which must be periodically cleaned and then inspected to ensure that the cleaning process has effectively removed all of the collected material. The small size of the flow channels renders the inspection process tedious and time-consuming and, therefore, imparts a considerable cost to the overall cleaning/inspection process. The high initial cost of the thick metal plates precludes discarding or disposing of the plates as an alternative to cleaning. Therefore, it would be desirable to provide a separator which is less bulky. In addition, linking a plurality of separation chambers in such separators will dramatically increase the cost of the separator, with two serially linked separation chambers typically costing twice as much as a single chamber, and a thousand serially linked separation chambers costing a thousand times more than a single separation chamber.

Accordingly, it is a primary object of this invention to provide a separator which can separate immiscible components differing in viscosity values as well as immiscible components differing in density values.

It is another object of this invention to provide a separator composed of a branched structure wherein separation occurs within the branched structure.

It is another object of this invention to provide a separator which effects separation using only one plate.

It is a further object of this invention to provide a separator which affects separation using a single surface of a single plate.

An additional object of this invention is to provide a separator which is less bulky and less expensive to make, inspect, clean, re-use or replace.

A further object of this invention is to provide a method of separating immiscible components from a fluid mixture thereof wherein the method involves the use of a plate-type separator having the characteristics set forth in the preceding objects.

These and other objects which are achieved according to the present invention can be readily discerned from the following description.

SUMMARY OF THE INVENTION

One aspect of this invention is directed to a plate-type separator for separating a plurality of immiscible components from a multicomponent stream thereof. The separator contains at least one separator flow plate having formed on a common facial surface thereof at least one separation chamber comprising:

at least one inlet means;

a channel assembly in fluid communication with the inlet means, the assembly comprising at least one branched-channel structure containing a main flow channel split at a downstream branch-point end thereof into at least two branching flow channels, wherein the main flow channel is adapted to separate a multicomponent fluid stream passing therethrough into a plurality of substantially discrete fluid phases having different average density or average viscosity values, further wherein each of the branching flow channels is disposed to receive one of the discrete phases; and a plurality of outlet means in fluid communication with the branching flow channels.

A second aspect of this invention is directed to a method of separating a plurality of mutually immiscible components from a multicomponent stream thereof by means of the separator of this invention, wherein the method involves passing the multicomponent fluid stream through the at least one separation chamber to form a plurality of substantially discrete phases thereof, the phases having different average density or average viscosity values.

The separator of this invention can be used to separate immiscible components which differ in density (i.e., buoyancy) or in viscosity. Density-based separation uses gravity to separate immiscible components, while viscosity-based separation relies primarily on shear forces. In one preferred embodiment of the density-based separator and method of this invention, centrifugal acceleration is used to vary the gravitational force.

The separator and method of this invention provide several advantages. For example, the separator is compact and relatively easy and inexpensive to make, inspect, clean, re-use and replace. Furthermore, the separator and method of this invention can separate immiscible components by means of a single flow plate, more particularly, by means of a single surface of a single flow plate. In addition, the separator can be composed of a single thin plate or a plurality of thin plates, which can be relatively inexpensively and easily micromachined, preferably etched. Forming the separation chamber or chambers in the separator by means of a micromachining, particularly etching, permits the addition, at little or no extra cost, of a large number of separation chambers to the separator, wherein the separators are disposed in parallel side-by-side configurations and/or joined in serial end-to-end fashion. The use of a large number of separation chambers has the advantage of improving the purity of the component streams separated by means of the method and separator of the present invention. Thus, with the use of etched flow plates, fine tuning of the separation method of this invention can be carried out for optimum results with little or no extra effort and cost. Furthermore, because separation occurs in one or more separation chambers formed on a plate surface, the use of a separation chamber in accordance with the present invention obviates the need for additional equipment to carry out separation.

BRIEF DESCRIPTION OF THE DRAWINGS

FIG. 2 is a schematic top plan view of a first embodiment of a viscosity-based separator within the scope of this invention.

FIG. 3 is a schematic top plan view of a second embodiment of a viscosity-based separator within the scope of this invention.

FIG. 6 is a schematic top plan view of a third separator flow plate useful in a second embodiment of a density-based separator of the present invention.

DETAILED DESCRIPTION OF THE INVENTION

Figure 1:
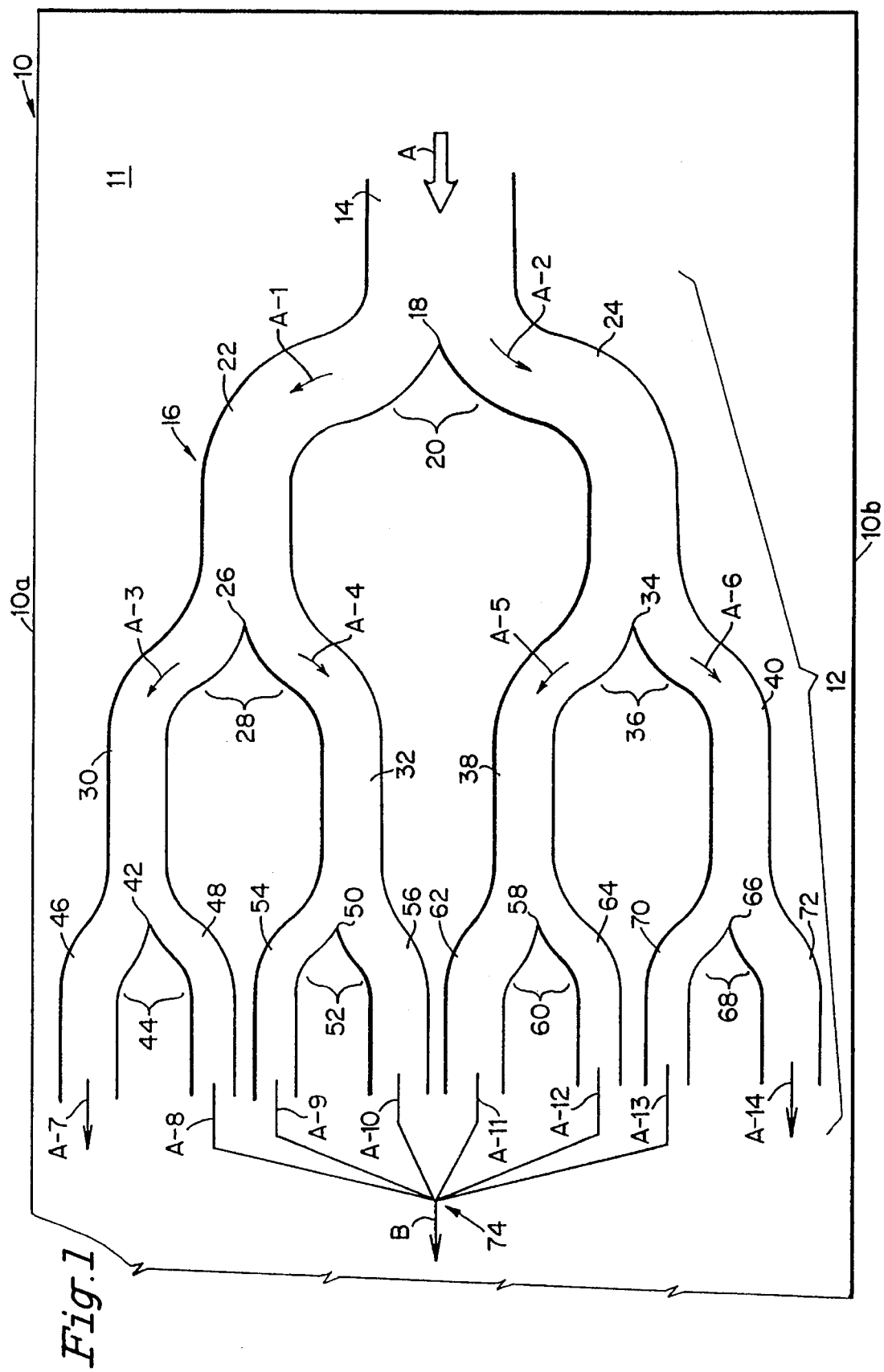
FIG. 1 is a schematic top plan view of a first embodiment of a density-based separator flow plate within the scope of this invention.

In the present invention, two or more immiscible fluid components are separated from a mixture thereof on the basis of the density or viscosity differences of the components. Preferably, the components to be separated in accordance with the present invention have widely different viscosity or density values.

The term "fluid" as used herein includes liquids, gases, liquid/gas combinations, and liquid/solid combinations. Liquid mixtures are preferred in the present invention. The term "component" as used herein refers to one or more materials having similar viscosity or density values. The term "immiscible" as used herein means that the components are insoluble or substantially insoluble with one another.

The plate-type separator of this invention is composed of at least one separator flow plate which has formed on a common facial surface thereof at least one separation chamber. The separation chamber(s) contains at least one inlet means, a channel assembly in fluid communication with the inlet means, and a plurality of outlet means in fluid communication with the channel assembly.

The inlet means and the outlet means may be comprised of holes or ports. The channel assembly contains at least one branched-channel structure and preferably a plurality of branched-channel structures. Each branched-channel structure is composed of a main flow channel split at a downstream branch-point end thereof into at least two branching flow channels.

The main flow channel in the branched-channel structure(s) is adapted to separate the multicomponent fluid stream passing therethrough into substantially discrete fluid phases having different average density or viscosity values. Each phase may contain one or more components. The phase(s) having the lower average density will be referred to herein as the "lower density phase(s)", while the phase(s) having the higher average density will be referred to herein as the "higher density phase(s)". Likewise, the phase(s) having the lower average viscosity will be referred to herein as the "lower viscosity phase(s)", while the phase(s) having the higher average viscosity will be referred to herein as the "higher viscosity phase(s)".

The branching flow channels in the branched-channel structure(s) are disposed to receive the phases formed in the main flow channel. Each phase flows as an output stream into a branching flow channel. The branching flow channels may direct the output streams to the outlet means or may serve as main flow channels wherein the output streams undergo further separation in accordance with the present invention.

In the separator and method of this invention, the dimensions of the main flow channel and the flow velocity at which the stream is passed through the main flow channel are selected on the basis of whether the components will be separated according to density or viscosity.

In a viscosity-based embodiment of the separator of this invention, the main flow channel is preferably long and narrow, and the flow velocity of the stream passing therethrough is preferably high enough to generate shear forces in the channel. On the other hand, in a density-based embodiment of the separator of this invention, the main flow channel will preferably be wide, and the flow velocity of the stream passing therethrough will be relatively low.

Parameters which generally affect the ease with which viscosity-differing components can be separated in accordance with the present invention include the miscibility of the components; the viscosities of the components; the percent volume of the components in the mixture; the shear rate (i.e., the linear velocity gradient through the main flow channel, in reciprocal seconds, assuming viscosity is constant); the shear temperature; and the length of time for which the stream undergoes shear.

The viscosity differences between the components at a particular temperature can be characterized as the differences in the "coefficient of friction" between the components. The greater the viscosity difference, the higher will be the difference in the coefficient of friction. With higher coefficient of friction differences between the components, lower shear rates will generally be effective to separate the components. With lower coefficient of friction differences, higher shear rates are generally required to separate the components.

The length of the main flow channel will depend on the coefficient of friction differences and on the shear rate used in the main flow channel. Assuming shear rate is the same, a longer main flow channel is usually required to separate components with a lower coefficient of friction difference than is required to separate components having a higher coefficient of friction difference. However, for a given coefficient of friction difference, higher shear rates will usually allow the use of shorter main flow channels since the increase in shear rate will generally compensate for the corresponding decrease in channel length.

As stated hereinabove, in a viscosity-based separator of the present invention, the main flow channel(s) is adapted to permit the stream to flow therein at a flow velocity high enough to generate large amounts of shear. The shear properties of the main flow channel will depend on the length, diameter and cross-sectional shape of the channel. The term "diameter" as used herein refers to the diameter of a round cross-section or the average diameter of a non-round cross-section. The term "average diameter" as used herein refers to the average of the total diameter values in a non-round cross-section.

As stated previously herein, high shear properties are typically achieved by making the main flow channel long and narrow. Preferably, the main flow channel will have a length-to-diameter ("L/D") ratio of from about 30:1 to about 100:1, and preferably of about 100:1. The cross-section of the main flow channel can be round or non-round. Higher shear is generally obtained with non-round cross-sections than with round cross-sections because the non-round cross-sections have greater surface area for contact with the stream passing through the main flow channel. The more surface-area contact, the greater the shear. Examples of suitable non-round shapes include slot shapes, curved shapes, triangular shapes, square shapes, crescent shapes, cross shapes, star shapes, Y shapes, and the like.

The shearing action generally causes one or more components of similar viscosity to move away from the central region of the main flow channel and the other component or components of similar viscosity to move toward the central region of the main flow channel. Preferably, the shear temperature and the shear rate are sufficient to separate the immiscible components into a sheath/core configuration having a core portion and a sheath portion surrounding the core portion. Most preferably, the core portion substantially contains the higher viscosity phase and the sheath portion substantially contains the lower viscosity phase.

In the viscosity-based separator of this invention, the discrete phases exit the branched-channel assembly in a sheath/core configuration having a core component and a sheath component, wherein the core component contains a first discrete phase and the sheath component contains a second discrete phase.

In the viscosity-based separator and method of this invention, the shear rate at which the mixture is passed through the main flow channel preferably ranges from about 200 1/sec to about 1100 1/sec, more preferably from about 200 1/sec to about 700 1/sec, and most preferably from about 300 1/sec to about 500 1/sec. Unlike the shear rate, the shear temperature at which the multicomponent stream is passed through the main flow channel will depend entirely on the particular materials present in the stream. Generally, the shear temperature should be that temperature at which the components will separate from each other in accordance with this invention at the particular shear rate employed.

When the separator of this invention functions as a "viscosity-based separator" the separator flow plate(s) can be oriented in any direction, preferably horizontally or vertically.

The flow-transfer plate may be disposed facially adjacent to the separator flow plate or can be separated therefrom by one or more intervening plates as long as through-holes are present to allow fluid flow between the flow-transfer channel and the first and second branching flow channels.

One embodiment of the "density-based separator" of this invention is in the form of a "centrifugal-type, density-based separator" wherein the separator flow plate(s) is rotated during use of the separator to separate the immiscible components, wherein the rotation generates a centrifugal force sufficient to cause separation of the immiscible components. A second embodiment is in the form of a "stationary-type, density-based separator" wherein the separator flow plate(s) remains stationary during use of said separator to separate the immiscible components.

When the separator of this invention functions as a "stationary-type, density-based separator" the separator plate(s) is generally oriented in a vertical direction. When the separator is a "centrifugal-type, density-based separator" the separator can be oriented either vertically or horizontally, preferably horizontally. The main flow channel and the branching flow channels in the density-based embodiments of the separator of this invention are preferably wide so as to provide high-volume, low flow-velocity zones wherein the components can separate.

One embodiment of a stationary-type, density-based separator within the scope of this invention can be seen, for example, in FIG. 1 herein.

In the centrifugal-type, density-based embodiment of the separator of this invention, centrifugal acceleration is used to vary the gravitational separation force. In this embodiment, the separator flow plate(s) is circular in shape. The circular separator flow plate(s) has formed on a common facial surface thereof one or more fluid inlet ends, one or more fluid outlet ends, and at least one separation chamber. In addition, in this embodiment, the separator further contains an energy-transferring means in communication with the circular separator flow plate(s). The separator preferably comprises a plurality of the circular separator flow plates stacked in front-to-back facial contact with adjacent circular separator flow plates, wherein at least one of the fluid outlet end in each of the circular separator flow plates is aligned with and in fluid communication with at least one fluid inlet end disposed on an adjacent downstream circular separator flow plate.

In the centrifugal-type, density-based separator, the energy-transferring means preferably comprises a movable means in physical contact with the circular separator flow plate(s). More preferably, the movable means is an axle. In most preferred embodiments, the circular separator flow plate(s) is placed in concentric contact with the axle, said axle being centrally disposed through the circular separator flow plate(s).

In both the density-based and the viscosity-based embodiments of the separator of this invention, the main flow channel is preferably adapted such that fluid flow therethrough will be substantially laminar and non-turbulent. The Reynolds value (a measure of the turbulence in the flow) of the flow is preferably less than about 4000, more preferably less than about 3000, and most preferably less than about 2000. To minimize or prevent turbulence in the flow, the inner wall of the main flow channel should be smooth.

In preferred embodiments of the centrifugal-type and stationary-type, density-based separators of this invention, the branched-channel structure will contain two branching flow channels. In preferred embodiments of the viscosity-based separator of this invention, the branched-channel structure will contain three branching flow channels. Furthermore, the branching flow channels split from a common branch-point are preferably parallel to one another.

Each of the branching flow channels may also serve as a main flow channel for subsequent branching flow channels or as an outlet channel. The same parameters discussed previously herein with respect to the separation of the components in the main flow channel also apply to the separation of components in the branching flow channels which also function as main flow channels.

The outlet means of the separation chamber(s) collect the output streams passing through the branching flow channels and direct the output streams to desired locations.

The separation chamber used in the separator of this invention preferably may contain one separation chamber or a plurality of separation chambers, depending on the specific task for which the separator is to be used.

In either the viscosity-based or the density-based embodiment, the separator of this invention may be composed of a single separator plate or a plurality of separator plates. When the separator contains a plurality of plates, the plates can be disposed in an end-to-end stacked configuration, a side-by-side stacked configuration or in a front-to-back facially stacked configuration.

Likewise, in either the viscosity-based or the density-based embodiment, the separator may be composed of a single separation chamber or a plurality of separation chambers disposed in a side-by-side configuration, an end-to-end serially-joined stacked configuration, or a front-to-back facially stacked configuration.

The overall flow rate in embodiments of both the density-based separator and the viscosity-based separator can be maintained at a relatively high value by using a plurality of separators disposed in adjacent, parallel fashion. Serially joining a plurality of channeled structures improves the degree of separation of the components.

The separator flow plate(s) may be composed of metal or non-metal. Non-limiting examples of suitable materials for use in the separator of this invention include, plastics, such as thermoplastic engineering resins, e.g., polyester resin, polypropylene, polyamide, and the like; thermoset resins, e.g., epoxy resin; inorganic cement; fiberglass; metal, e.g., stainless steel, aluminum, aluminum-based alloys, nickel, iron, copper, copper-based alloys, mild steel, brass, titanium, and the like; ceramics; linoleum; and wood. Preferably, the separator plate(s) and the flow-transfer plate(s) are made of a material which is inert to the fluid stream passing through the channels of the plates. Because of its inertness and the relatively low cost associated with its use, stainless steel is a particularly useful in the plate(s) of this invention.

In preferred embodiments of the viscosity-based separator of this invention, the separator further contains at least one flow-transfer plate in fluid communication with the branched-channel structure(s). The flow-transfer plate has at least one flow-transfer channel disposed in fluid communication with a first branching flow channel and a second branching flow channel. The flow-transfer channel is adapted to receive a first of the discrete phases from the first branching flow channel and to transfer the first discrete phase to the second branching flow subchannel to combine the first discrete phase with a second discrete phase passing through the second branching flow channel. The separator plate(s) and the flow-transfer plate(s) can be separated by an intervening plate or plates or may be laminated, bonded, glued, soldered, brazed or otherwise joined together to form a composite.

Each separator flow plate and flow-transfer plate used in the separator of this invention may have a thickness of about 0.001 inch or more and, preferably, from about 0.001 inch to about 1.0 inch. If the separator is a viscosity-based separator, the separator flow plate(s) and the flow-transfer plate have a most preferred thickness ranging from about 0.01 inch to about 0.10 inch. If the separator is a density-based separator, the separator flow plate(s) has a most preferred thickness ranging from about 0.25 inch to about 1.00 inch.

A micromachining process is preferably used to form the respective separation chamber(s) and flow transfer channel(s) in the separator flow plate(s) and the flow-transfer plate(s). Non-limiting examples of suitable micromachining processes include etching, stamping, punching, pressing, cutting, molding, milling, lithographing, particle blasting, or combinations thereof. Most preferably, the micromachining process is etching. Etching, e.g., photochemical etching, provides precisely formed channels while being less expensive than many other conventional machining processes, such as, for example, drilling, milling and reaming. Furthermore, etched perforations generally do not have the sharp corners, burrs, and sheet distortions associated with mechanical perforations. Etching processes are well known in the art. Typically, etching is carried out by contacting a surface with a conventional etchant.

In preferred embodiments, the separator of this invention further contains at least one cover plate disposed on the common facial surface of the separation chamber(s). The cover plate(s) encloses the separation chamber(s) to prevent leakage therefrom. The cover plate may be composed of any suitable material which allows it to fulfill its purpose. For example, the cover plate can be made of the same metal or non-metal used in the separator flow plate(s). Preferably, however, the cover plate is made of a transparent material such as glass or plastic (e.g., Lexan (Registered Trademark) polycarbonate available from General Electric Company) to allow direct visual observation of the separation chamber(s) to determine the sufficiency of the separation. Otherwise, the output streams exiting the outlet means of the separator may be analyzed to determine the degree of separation between the components. Furthermore, the dimensions of the cover plate can be the same as or different from those of the separator plate on which the cover plate is disposed. The separator plate and the cover plate may be laminated, bonded, glued, soldered, brazed or otherwise joined together to form a composite. Preferably, the separator plate and the cover plate are removably attached to one another to facilitate cleaning, inspection and reuse of the plates.

As stated previously herein, the present invention is further directed to a method for separating a plurality of immiscible components from a fluid mixture thereof by means of the plate-type separator of this invention. In the method of the present invention, a stream of the fluid mixture is passed through the separation chamber at a flow rate sufficient to cause separation of the stream into a plurality of substantially discrete phases. Most preferably, as mentioned previously herein, the stream is passed through the separation chamber(s) as a non-turbulent or substantially non-turbulent flow. When using a centrifugal-type, density-based separator as discussed previously herein and which is illustrated in FIGS. 4–6 herein, the method of this invention further comprises the step of causing the energy-transferring means to rotate the circular separator flow plate(s).

When separating first and second components from a two-component mixture thereof, two discrete phases are generally formed, wherein a first phase will have a higher average viscosity or density than a second phase.

The separator and method of this invention can be applied to a wide variety of immiscible components. In density-based separation in accordance with this invention, oil and water are common density-differing components which are to be separated. In viscosity-based separation in accordance with the present invention, molten thermoplastic polymers are common components to be separated.

Suitable thermoplastic polymer mixtures which can be subjected to the method of this invention include, for example, those polymer mixtures found in scraps resulting from fiber, yarn, fabric and plastics processing procedures, discarded consumer products, and other waste materials which are desired to be recycled.

Classes of thermoplastic polymers suitable for separation in the method of this invention include those useful in fiber spinning processes. Such polymers include, for example, polyamides, polyesters, and polyolefins. Non-limiting examples of polymer mixtures which can be separated include, e.g., polyamide/polyester mixtures, polyamide/polyolefin mixtures, and polyester/polyolefin mixtures. Polycaproamide/polyethylene mixtures are readily separated in the practice of the method of this invention.

Other particular polymer mixtures which can be separated according to the method of this invention include, for example, polycaproamide/polyethylene terephthalate, polycaproamide/polypropylene, polycaproamide/high density polyethylene; polyethylene terephthalate/polyethylene and polyethylene terephthalate/polypropylene mixtures. Such mixtures are not intended to limit the present invention as it is believed that any immiscible thermoplastic polymer mixture having viscosity differences can be separated according to the present invention. The weight ratio of each polymer component contained in the liquid mixture to be separated can vary widely from 99:1 to 1:99.

Polymer output stream or streams exiting the outlet means of the separator of this invention can be recycled in various ways. For example, such output polymer stream(s) may be directed into a spinneret and spun into thermoplastic fibers or filaments; extruded into a die and cut into resin chips; undergo continuous extrusion to form plastic parts; or undergo a combination of the foregoing methods.

The present invention will now be described by reference to FIGS. 1–6 herein.

FIG. 1 is a schematic top plan view of a separator flow plate useful in an embodiment of a stationary-type, density-based separator within the scope of this invention.

In FIG. 1, flow plate 10 is oriented vertically such that side 10a of the plate is above side 10b. Plate 10 has on a facial surface 11 thereof a separation chamber 12. Separation chamber 12 is composed of an inlet channel 14 which also serves as a "main" flow channel and a channel assembly 16 in fluid communication with channel 14. Channel assembly 16 is composed of a plurality of branched-channel structures 20, 28, 36, 44, 52, 60 and 68. Each of the branched-channel structures is composed of two branching flow channels. The branching flow channels in structures 20, 28, and 36 also serve as main flow channels. The branching flow channels in structures 44, 52, 60 and 68 also serve as outlet channels.

The first branched-channel structure 20 contains main flow channel 14 (also serving as the inlet channel as stated hereinabove) and branching flow channels 22 and 24 which branch from branch-point 18. Branching flow channels 22 and 24 further serve as main flow channels in branched-channel structures 28 and 36, respectively. Structure 28 is composed of main flow channel 22 and branching flow channels 30 and 32 which branch from branch-point 26. Structure 36 contains main flow channel 24 and branching flow channels 38 and 40 which branch from branch-point 34. Branching flow channels 30 and 32 further serve as main flow channels for respective branched-structures 44 and 52. Branching flow channels 38 and 40 also serve as main flow channels for branched-channel structures 60 and 68, respectively. Structure 44 contains main flow channel 30 and branching flow channels 46 and 48 which split from branch-point 42. Structure 52 contains main flow channel 32 and branching flow channels 54 and 56 which split from branch-point 50. Structure 60 contains main flow channel 38 and branching flow channels 62 and 64 which split from branch-point 58. Structure 68 contains main flow channel 40 and branching flow channels 70 and 72 which split from branch-point 66. Branching flow channels 46, 48, 54, 56, 62, 64, 70 and 72 also serve as outlet channels.

A two-component fluid stream A composed of a high density fluid component and a low density fluid component can be directed through channel 14 of separation chamber 12. Stream A splits at branch-point 18 into streams A-1 and A-2 which flow respectively into branching flow channels 22 and 24. Stream A-1 splits at branch-point 26 into streams A-3 and A-4, which flow into respective channels 30 and 32. Stream A-3 splits at branch-point 42 into streams A-7 and A-8, which flow into channels 46 and 48, respectively. Stream A-4 splits at branch-point 50 into streams A-9 and A-10, which flow into channels 54 and 56, respectively. Stream A-2 splits at branch-point 34 into streams A-5 and A-6, which flow into respective channels 38 and 40. Stream A-5 splits at branch-point 58 into streams A-11 and A-12, which flow respectively into channels 62 and 64. Stream A-6 splits at branch-point 66 into streams A-13 and A-14, which flow into respective channels 70 and 72.

Each of the channels serving as main flow channels in separation chamber 12 will have a geometry which is sufficient to separate the stream passing therethrough into two substantially discrete phases (not shown). The low density component will tend to flow towards the top portion 10a of plate 10, while the high density component will tend to flow towards the bottom portion 10b of plate 10. Thus, stream A-7 will preferably be substantially composed of the low density component, while stream A-14 will preferably be substantially composed of the high density component. The ratio of low density component to high density component will decrease in respective streams A-8, A-9, A-10, A-11, A-12, and A-13.

Because streams A-7 and A-14 contain the highest concentration of the low density component and the high density component, respectively, these streams are preferably collected separately. Because the remaining streams contain intermediate amounts of the low and high density components, these streams can be directed, as shown in FIG. 1, to a common collection point 74 and recombined as stream B.

FIG. 2 illustrates a first embodiment of a viscosity-based separator within the scope of the present invention.

Separator 100 is composed of a flow separator plate 102 and a flow-transfer plate 104 (shown in broken lines) disposed facially adjacent to a back facial surface (not shown) of flow separator plate 102. Plates 102 and 104 each have a first side, i.e., 102a and 104a, respectively; and an opposite second side, i.e., 102b and 104b, respectively.

Plate 102 contains an inlet flow channel 106 which also serves as a main flow channel. Channel 106 splits at branch-point 108 into branching flow channels 110, 112, and 114. Channels 110 and 112 both serve also as main flow channels. Channels 110 and 114 contain respective through-holes 116 and 118. These through-holes lead to a flow-transfer channel 120 (shown in broken lines) formed in flow-transfer plate 104. Channel 110 splits at branch-point 122 into branching flow channels 124, 126 and 128. Channels 124 and 126 may further serve as main flow channels or as outlet channels. Channels 124 and 128 contain respective through-holes 138 and 140. These through-holes lead to a flow-transfer channel 142 (shown in broken lines) formed in flow-transfer plate 104.

Channel 112 splits at branch-point 130 into branching flow channels 132, 134 and 136. Channels 134 and 136 may further serve as main flow channels or as outlet channels. Channels 132 and 136 contain respective through-holes 144 and 146. These through-holes lead to a flow-transfer channel 148 (shown in broken lines) formed in flow-transfer plate 104.

A two-component fluid stream C containing a high viscosity component (not shown) and a low viscosity component (not shown) can be directed into separator 100 by means of channel 106. In channel 106, stream C is separated into substantially discrete phases (not shown), wherein a first phase (the "higher viscosity phase") has a higher average viscosity than a second phase (the "lower viscosity phase"). Stream C is split at branch-point 108 into streams C-1, C-2 and C-3, which flow into respective channels 110, 112 and 114. One of the phases, preferably the low viscosity phase, is split into streams C-1 and C-3. The high viscosity phase preferably flows as stream C-2. Stream C-3 flows via through-hole 118 into flow-transfer channel 120. From channel 120, stream C-3 flows via through-hole 116 into channel 110 where stream C-3 recombines with stream C-1 to form stream C-4.

Stream C-4 undergoes separation in channel 110 to form a second high viscosity phase (not shown) and a second low viscosity phase (not shown). Stream C-4 splits at branch-point 122 into streams C-5, C-6 and C-7. Streams C-5 and C-7 preferably contain the low viscosity phase and stream C-6 preferably contains the high viscosity phase. Stream C-5 flows through channel 124 and stream C-6 flows through channel 126. Stream C-7 flows via through-hole 140 into flow-transfer channel 142. From channel 142, stream C-7 flows via through-hole 138 into channel 124, where stream C-7 recombines with stream C-5 to form stream C-11, which is the stream which flows closest to side 102a.

Stream C-2 undergoes separation in channel 112 to form a third high viscosity phase (not shown) and a third low viscosity phase (not shown). Stream C-2 splits at branch-point 130 into streams C-8, C-9 and C-10. Streams C-8 and C-10 preferably contain the low viscosity phase and stream C-9 preferably contains the high viscosity phase. Stream C-9 flows through channel 134 and stream C-10 flows through channel 136. Stream C-8 flows via through-hole 144 into flow-transfer channel 148. From channel 148, stream C-8 flows via through-hole 146 into channel 136, where stream C-8 recombines with stream C-10 to form stream C-12, which is the stream which flows closest to side 102b.

In FIG. 2, the use of flow-transfer channels 120, 142 and 148 to carry streams of the separated low viscosity component (e.g., "sheath" polymer) from one branching flow channel to another branching flow channel eliminates unnecessary branching.

FIG. 3 illustrates a second embodiment of a viscosity-based separator within the scope of the present invention. Separator 200 is identical to separator 100 except that separator 200 contains two branching flow channels 226 and 234 which merge with one another.

Separator 200 is composed of a flow separator plate 202 and a flow-transfer plate 204 (shown in broken lines) disposed facially adjacent to a back facial surface (not shown) of flow separator plate 202. Plates 202 and 204 each have a first side, i.e., 202a and 204a, respectively; and an opposite second side, i.e., 202b and 204b, respectively. Plates 202 and 204 are both oriented vertically such that sides 202a and 204a are disposed above sides 202b and 204b, respectively.

Plate 202 contains an inlet flow channel 206 which also serves as a main flow channel. Channel 206 splits at branch-point 208 into branching flow channels 210, 212, and 214. Channels 210 and 212 both serve also as main flow channels. Channels 210 and 214 contain respective through-holes 216 and 218. These through-holes lead to a flow-transfer channel 220 (shown in broken lines) formed in flow-transfer plate 204. Channel 210 splits at branch-point 222 into branching flow channels 224, 226 and 228. Channels 224 and 226 may further serve as main flow channels or as outlet channels. Channels 224 and 228 contain respective through-holes 238 and 240. These through-holes lead to a flow-transfer channel 242 (shown in broken lines) formed in flow-transfer plate 204.

Channel 212 splits at branch-point 230 into branching flow channels 232, 234 and 236. Channels 234 and 236 may further serve as main flow channels or as outlet channels. Channels 232 and 236 contain respective through-holes 244 and 246. These through-holes lead to a flow-transfer channel 248 (shown in broken lines) formed in flow-transfer plate 204.

A two-component fluid stream D containing a high viscosity component (not shown) and a low viscosity component (not shown) can be directed into separator 200 by means of channel 206. In channel 206, stream D is separated into substantially discrete phases (not shown), wherein a first phase (the "higher viscosity phase") has a higher average viscosity than a second phase (the "lower viscosity phase"). Stream D is split at branch-point 208 into streams D-1, D-2 and D-3, which flow into respective channels 210, 212 and 214. One of the phases, preferably the low viscosity phase, is split into streams D-1 and D-3. The high viscosity phase preferably flows as stream D-2. Stream D-3 flows via through-hole 218 into flow-transfer channel 220. From channel 220, stream D-3 flows via through-hole 216 into channel 210 where stream D-3 recombines with stream D-1 to form stream D-4.

Stream D-4 undergoes separation in channel 210 to form a second high viscosity phase (not shown) and a second low viscosity phase (not shown). Stream D-4 splits at branch-point 222 into streams D-5, D-6 and D-7. Streams D-5 and D-7 preferably contain the low viscosity phase and stream D-6 preferably contains the high viscosity phase. Stream D-5 flows through channel 224 and stream D-6 flows through channel 226. Stream D-7 flows via through-hole 240 into flow-transfer channel 242. From channel 242, stream D-7 flows via through-hole 238 into channel 224, where stream D-7 recombines with stream D-5 to form stream D-11, which is the stream which flows closest to side 202a.

Stream D-2 undergoes separation in channel 212 to form a third high viscosity phase (not shown) and a third low viscosity phase (not shown). Stream D-2 splits at branch-point 230 into streams D-8, D-9 and D-10. Streams D-8 and D-10 preferably contain the low viscosity phase and stream D-9 preferably contains the high viscosity phase. Stream D-9 flows through channel 234 where the stream recombines with stream D-6 to form stream D-13. Stream D-10 flows through channel 236. Stream D-8 flows via through-hole 244 into flow-transfer channel 248. From channel 248, stream D-8 flows via through-hole 246 into channel 236, where stream D-8 recombines with stream D-10 to form stream D-12, which is the stream which flows closest to side 202b.

In FIG. 3, the use of flow-transfer channels 220, 242 and 248 to carry streams of the separated low viscosity component (e.g., "sheath" polymer) from one branching flow channel to another branching flow channel eliminates unnecessary branching.

Figure 4:
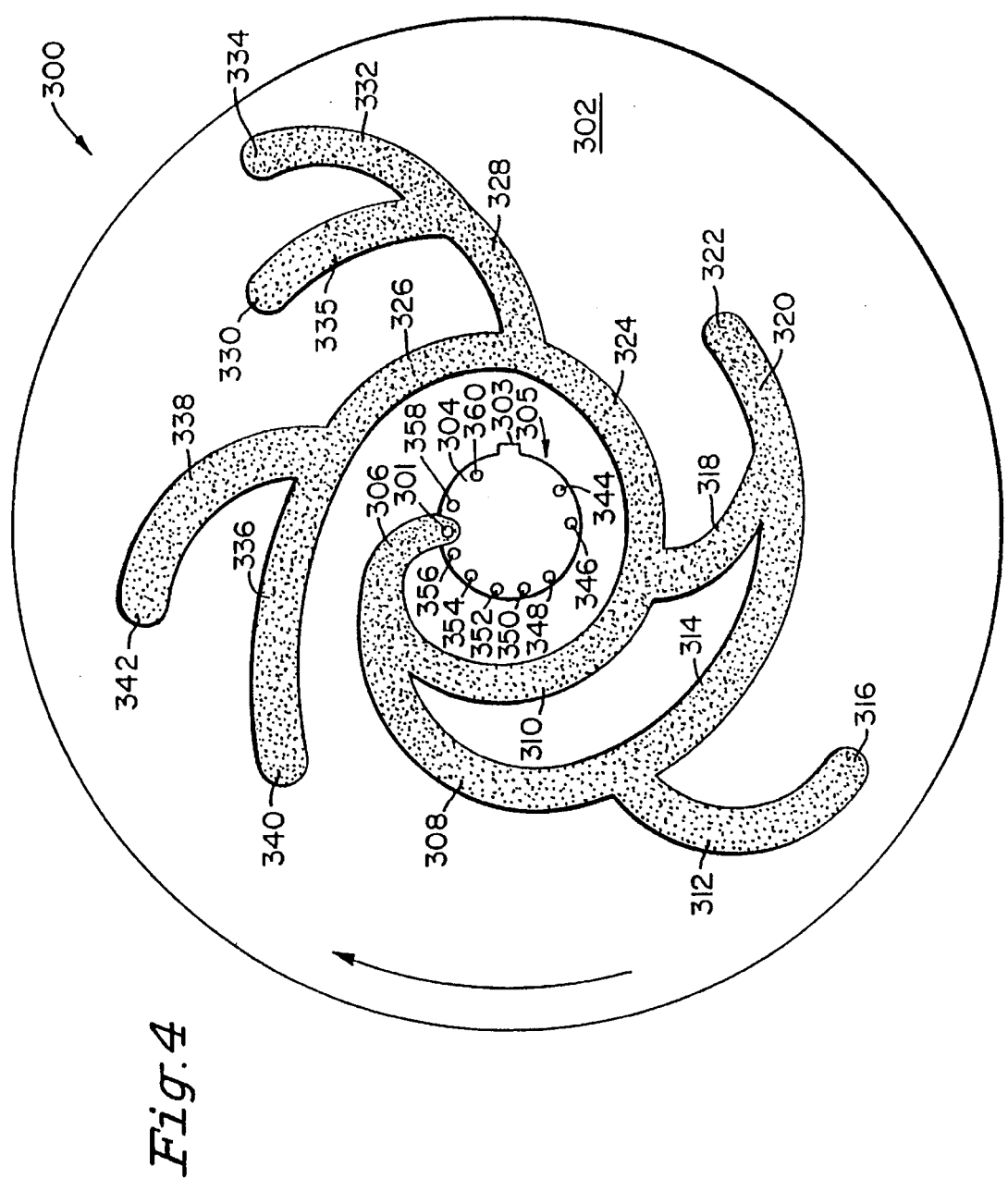
FIG. 4 is a schematic top plan view of a first separator flow plate useful in a second embodiment of a density-based separator of the present invention.
Figure 5:
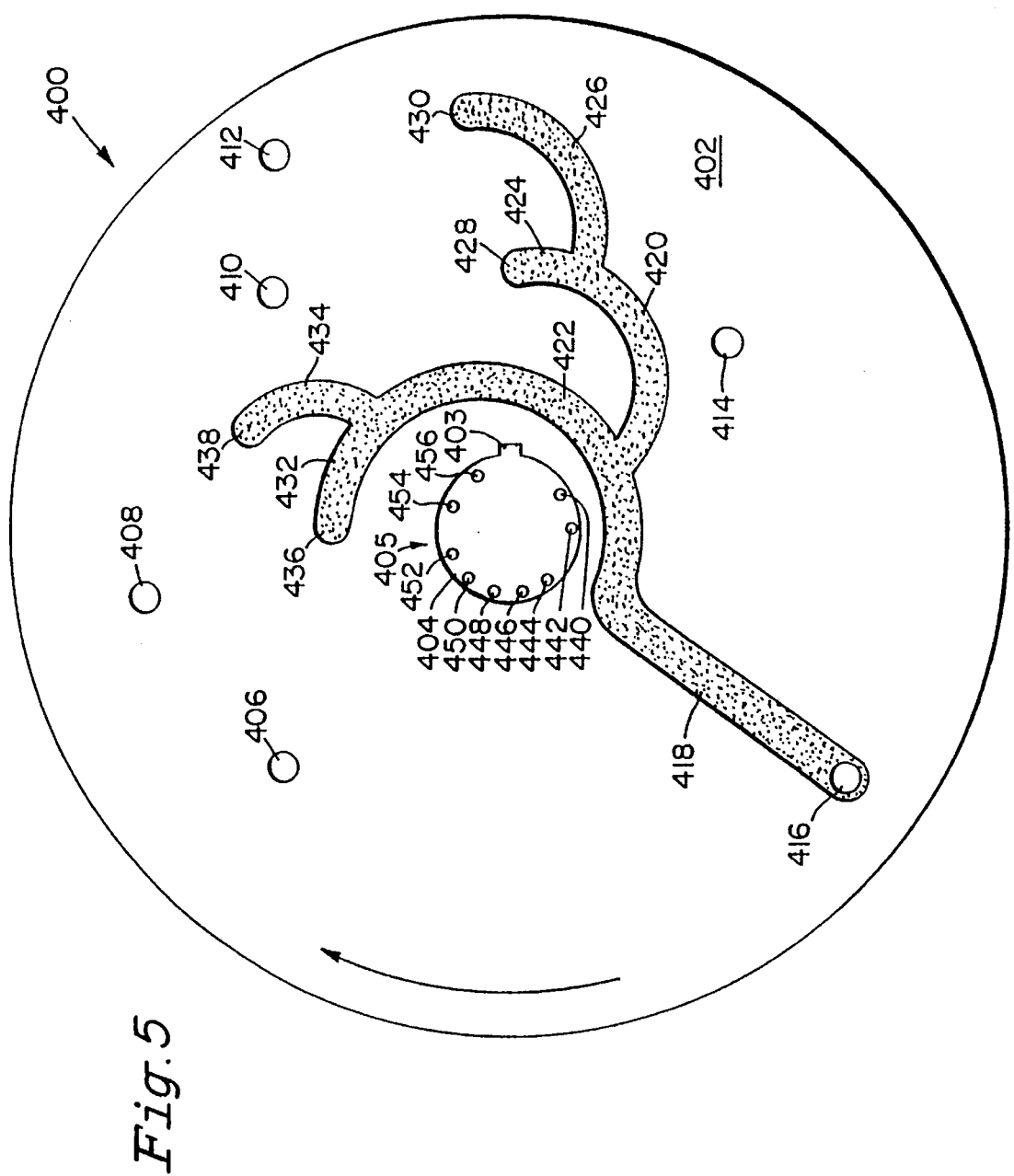
FIG. 5 is a schematic top plan view of a second separator flow plate useful in a second embodiment of a density-based separator of the present invention.

FIGS. 4–6 in combination represent an embodiment of a centrifugal-type, density-based separator within the scope of this invention, wherein centrifugal acceleration is used to vary the gravitational separation force. In FIGS. 4–6, etched surfaces are represented by cross-hatching, through-holes are represented in black, and unetched surfaces are represented in white.

The centrifugal-type, density-based separator represented in FIGS. 4–6 is made of three circular flow plates 300 (FIG. 4), 400 (FIG. 5) and 500 (FIG. 6) stacked together in a face-to-face configuration. Each plate may have formed in a central region thereof a central through-hole through which an axle may be disposed for driving the rotation of the plates in the direction of the arrows shown in FIGS. 4–6.

FIG. 4 illustrates a first plate 300 useful in the centrifugal-type density-based separator. Plate 300 can be the top plate or the bottom plate in the stack but is represented in FIG. 4 as the bottom plate. Plate 300 has formed on a front facial surface 302 thereof a central through-hole 305; a fluid inlet port 301 for the mixed fluid stream which is to undergo separation and a plurality of fluid outlet ports for split streams formed during the separation process. The fluid outlet ports are designated by reference numerals 344, 346, 348, 350, 352, 354, 356, 358 and 360. The outlet ports are preferably formed in an axle portion 304 disposed in central through-port 305. Axle portion 304 has a key portion 303 affixed to plate 300. Face 302 of plate 300 further has formed therein a main flow channel 306; a plurality of branching flow channels 308, 310, 312, 314, 318, 320, 324, 326, 328, 332, 335, and 338; and a plurality of channel-ends 316, 322, 334, 330, 340 and 342.

FIG. 5 illustrates a second plate 400 useful in the centrifugal-type, density-based separator. Plate 400 has formed on a front facial surface 402 thereof a central through-hole 405 in which is disposed an axle portion 404 having a key section 403 attached to plate 400. Axle portion 404 has formed therein a plurality of through-way ports 440, 442, 444, 446, 448, 450, 452, 454 and 456. These through-way ports are disposed for passage of the split streams flowing from plate 500 to plate 300. Facial surface 402 further has formed therein a main flow channel 418 having an inlet port 416 formed therein; a plurality of branching flow channels 420, 422, 424, 426, 432, and 434; a plurality of through-way ports 406, 408, 410, 412, and 414; and a plurality of channel-ends 428, 430, 436 and 438.

FIG. 6 represents a third plate 500 useful in the centrifugal-type, density based separator. Plate 500 has formed on a front facial surface 502 thereof a central through-hole 505 in which is disposed axle portion 504 having a key section 503 attached to plate 500. Axle portion 504 has formed therein a plurality of outlet ports 540, 542, 544, 546, 548, 550, 552, 554 and 556 for final split streams formed in the separation process. Facial surface 502 further has formed therein a plurality of inlet ports 508, 512, 516, 520, 524, 528, 532, 536 and 540 and a plurality of flow channels 506, 510, 514, 518, 522, 526, 530, 534, and 538.

A two-component fluid stream (not shown) containing a high density component (not shown) and a low density component (not shown) is fed via inlet port 301 into channel 306 in plate 300. The stream then flows (under compulsion from positive pressure exerted at port 301, which can be supplied, e.g., by a pump) through channel 306. As the plates rotate in the direction of the arrow shown in FIG. 4, the stream is separated into a low density fluid phase (not shown) and a high density fluid phase (not shown), the phases being substantially discrete from one another.

The high density component of the mixed fluid stream will tend to gravitate toward the outer edges of plate 300 (as well as to the outer edges of plates 400 and 500), while the low density component will tend to gravitate toward the inner region of plate 300 (as well as the inner regions of plates 400 and 500). Thus, in plate 300, the split substream (not shown) flowing into channel 312 will have the highest density of the split streams formed in plate 300, while the split stream (not shown) flowing into channel 336 will have the lowest density of the split streams formed in plate 300.

The highest-density split stream will flow through channel-end 316 upwardly through port 416 into channel 418 in plate 400. The positive pressure exerted at through-hole 301 pushes this split stream against centrifugal force toward the center of plate 400, where the stream passes through another series of branched flow channels to further separate the split stream according to density. The split stream flows through channel 418 which splits into channels 420 and 422, thus splitting the split-stream into two split-streams (not shown). One split-stream flows through channel 420 which splits into channels 426 and 424 to form additional split-streams (not shown), and a second split-stream flows through channel 422 which splits into channels 432 and 434 to form additional split-streams. The various split-streams formed in plate 400 will pass upwardly through channel-ends 428, 430, 436 and 438 to respective ports 512, 516, 528, and 532 in plate 500 and then into respective channels 510, 514, 526 and 530. Through channels 510, 514, 526 and 530, the split-streams flow inwardly to axle portion 504 and then pass downwardly through respective ports 540, 556, 550 and 548.

Meanwhile, the lowest density split-stream formed in plate 300 will flow through channel-end 340 upwardly through port 406 in plate 400 and then upwardly through port 536 in plate 500 where the split-stream will then flow through channel 534 inwardly toward axle portion 504, where the split-stream flows downwardly through port 546.

The split-stream exiting plate 300 at channel-end 322 will flow upwardly through port 414 in plate 400 and then upwardly through port 508 and into channel 506 in plate 500 where the stream will then flow inwardly to axle portion 504 and downwardly through port 542.

The stream exiting plate 300 at channel-end 330 will flow upwardly through port 410 in plate 400 and then upwardly through port 524 and into channel 522 in plate 500 where the stream will then flow inwardly to axle portion 504 and downwardly through port 552.

The stream exiting plate 300 at channel-end 334 will flow upwardly through port 412 in plate 400 and then upwardly through port 520 and into channel 518 in plate 500 where the stream will then flow inwardly to axle portion 504 and downwardly through port 554.

The stream exiting plate 300 at channel-end 342 will flow upwardly through port 408 in plate 400 and then upwardly through port 540 and into channel 538 in plate 500 where the stream will then flow inwardly to axle portion 504 and downwardly through port 544.

Thus, the exit ports in plate 500 return the separated streams to a convenient collection point (not shown) disposed in the axle. Subsequent to flow through the axle, the separated streams can be combined in any desired manner.

The specific pattern of where channels branch, how many different plate surfaces are required, and on which plates the return channels may be provided will depend on the specific separation to be performed.

Although the present invention has been described with reference to preferred embodiments, those skilled in the art will recognize that changes may be made in form and detail without departing from the spirit and scope of the invention.

What is claimed is:

1. A plate-type separator, comprising at least one separator flow plate having formed on a common facial surface thereof at least one separation chamber comprising:

at least one inlet means formed on said common facial surface;

a channel assembly in fluid communication with said inlet means and formed on said common facial surface, said assembly comprising at least one branched-channel structure containing a main flow channel split at a downstream branch-point end thereof into at least two branching flow channels, wherein said main flow channel has a geometry sufficient to separate a multicomponent fluid stream passing therethrough into a plurality of substantially discrete fluid phases having different average density or average viscosity values, further wherein each of said branching flow channels is disposed to receive one of said discrete phases from said main flow channel so as to physically separate said discrete phases formed in said main flow channel from one another; and a plurality of outlet means in fluid communication with said branching flow channels and formed on said common facial surface.

2. A separator according to claim 1, wherein said geometry of said main flow channel is sufficient to permit said fluid stream to flow through said main flow channel at a flow velocity sufficient to generate a shear force in said main flow channel, said shear force being sufficient to cause said stream to separate into two substantially discrete phases having different average viscosity values.

3. A separator according to claim 2, further comprising at least one flow-transfer plate in fluid communication with said branched-channel structure, wherein said flow-transfer plate comprises at least one flow-transfer channel disposed in fluid communication with a first branching flow channel and a second branching flow channel, wherein said flow-transfer channel is adapted to receive a first of said discrete phases from said first branching flow channel and to transfer said first discrete phase to said second branching flow channel to combine said first discrete phase with a second discrete phase passing through said second branching flow channel.

4. A separator according to claim 3, wherein said geometry of said main flow channel is sufficient to permit substantially non-turbulent flow of said multicomponent fluid stream through said main flow channel.

5. A separator according to claim 4, wherein said at least one separator plate is disposed in a vertical orientation or in a horizontal orientation, wherein in said vertical orientation, said inlet means is disposed above or below said outlet means; further wherein in said horizontal orientation, said inlet means is disposed laterally with respect to said outlet means such that said inlet means is neither above nor below said outlet means.

6. A separator according to claim 5, wherein said at least one branched-channel structure is arranged such that said discrete phases exit said branched-channel assembly in a sheath/core configuration having a core component and a sheath component, wherein said core component comprises a first discrete phase and said sheath component comprises a second discrete phase.

7. A separator according to claim 1, wherein said geometry of said main flow channel is sufficient to permit said fluid stream to flow through said main flow channel at a flow velocity sufficient to cause said stream to separate into a first substantially discrete fluid phase having a first average density value and a second substantially discrete fluid phase having a second average density value which is higher than said first average density value.

8. A separator according to claim 7, wherein said geometry of said main flow channel is sufficient to permit substantially non-turbulent flow of said multicomponent fluid stream through said main flow channel.

9. A separator according to claim 1, wherein said separator is a stationary-type, density-based separator, wherein the at least one separator flow plate remains stationary during use of said separator to separate said immiscible components.

10. A separator according to claim 9, wherein said at least one separator flow plate is oriented in said vertical direction.

11. A separator according to claim 1, wherein said separator is a centrifugal-type, density-based separator, wherein said at least one separator flow plate is rotated during use of said separator to separate said immiscible components, wherein said rotation generates a centrifugal force sufficient to cause said separation of said immiscible components.

12. A separator according to claim 11, wherein said at least one separator flow plate is oriented in said horizontal direction.

13. A separator according to claim 1, wherein said at least one separator plate comprises a plurality of said at least one separation chamber, wherein said plurality of separation chambers are disposed in a side-by-side configuration, an end-to-end serially-joined stacked configuration, or a front-to-back facially stacked configuration.

14. A separator according to claim 1, wherein said at least one separator plate has a thickness of from about 0.001 inch to about 1.0 inch.

15. A separator according to claim 1, wherein said at least one separation chamber is an etched structure.

16. A separator according to claim 1, further comprising at least one cover plate disposed on said common facial of said at least one separation chamber.

17. A plate-type, centrifugal-type, density-based separator, comprising at least one rotatable, circular separator flow plate having formed on a common facial surface thereof at least one separation chamber comprising:

at least one inlet means formed on said common facial surface;

a channel assembly in fluid communication with said inlet means and formed on said common facial surface, said assembly comprising at least one branched-channel structure containing a main flow channel split at a downstream branch-point end thereof into at least two branching flow channels, wherein said main flow channel has a geometry sufficient to separate a multicomponent fluid stream passing therethrough into a plurality of substantially discrete fluid phases having different average density or average viscosity values, further wherein each of said branching flow channels is disposed to receive one of said discrete phases from said main flow channel so as to physically separate said discrete phases formed in said main flow channel from one another; and a plurality of outlet means in fluid communication with said branching flow channels and formed on said common facial surface.

18. A separator according to claim 17, wherein said at least one circular separator flow plate has formed on a common facial surface thereof one or more fluid inlet ends, one or more fluid outlet ends, and at least one separation chamber, further wherein said separator further comprises an energy-transferring means in communication with said at least one circular separator flow plate.

19. A separator according to claim 18, wherein said separator comprises a plurality of said at least one circular separator flow plate, said plates being stacked in front-to-back facial contact with adjacent circular separator flow plates, wherein at least one of said fluid outlet end in each of said circular separator flow plates is aligned with and in fluid communication with at least one fluid inlet end disposed on an adjacent downstream circular separator flow plate.

20. A separator according to claim 19, wherein said energy-transferring means comprises a movable means in physical contact with said at least one circular separator flow plate.

21. A separator according to claim 20, wherein said movable means comprises an axle, wherein said at least one circular separator flow plate is placed in concentric contact with said axle and said axle is centrally disposed through said at least one circular separator flow plate.

* * * * *